United States Patent [19]

Kondo et al.

[11] Patent Number: 4,540,671
[45] Date of Patent: Sep. 10, 1985

[54] GLASS-CERAMIC PRODUCT

[75] Inventors: Kazuo Kondo; Masahiko Okuyama, both of Aichi, Japan

[73] Assignee: NGK Spark Plug Co., Ltd., Nogoya, Japan

[21] Appl. No.: 552,190

[22] Filed: Nov. 15, 1983

[30] Foreign Application Priority Data

Nov. 15, 1982 [JP] Japan ................ 57-200020

[51] Int. Cl.³ ............ C03C 3/22; C03B 32/00; C04B 33/34
[52] U.S. Cl. ............................ 501/9; 65/33; 264/60
[58] Field of Search ............ 264/60; 501/9; 65/33

[56] References Cited

U.S. PATENT DOCUMENTS 3,597,305  8/1971  Giffen .................... 264/60
3,669,715  6/1972  Meyer .................... 264/60
3,673,049  6/1972  Giffen .................... 264/60

*Primary Examiner*—Donald Czaja
*Assistant Examiner*—Mary Lynn Fertig
*Attorney, Agent, or Firm*—Sughrue, Mion, Zinn, Macpeak, and Seas

[57] ABSTRACT

A glass-ceramic product is disclosed. The glass product is produced by combining 0.1 to 6 wt % of a compound selected from the group consisting of $B_2O_3$ and $P_2O_5$ with a mixture. The mixture includes 54 to 63 wt % $SiO_2$, 20 to 28 wt % $Al_2O_3$, 10 to 18 wt % MgO and 2 to 6 wt % ZnO. From the combined compound and mixture are formed a glassy material and then glassy material is ground in order to form a frit. The frit is then molded and the molded frit is fired into a crystalline form. The resulting glass-ceramic product has a low permittivity as compared with alumina and low power factor tan δ. Further, the product has a coefficient of thermal expansion which is comparable with the value for silicon semiconductor chips. The product also has other desirable characteristics such as its firing and crystallizing temperature, moisture absorption and mechanical strength.

8 Claims, No Drawings

GLASS-CERAMIC PRODUCT

FIELD OF THE INVENTION

The present invention relates to a glass-ceramic product, and more particularly, to a glass-ceramic product having properties making it suitable for use as electrically insulating ceramic materials.

BACKGROUND OF THE INVENTION

In general, electrically insulating ceramic materials are made of alumina as a major component as described in U.S. Pat. Nos. 3,423,517 and 3,723,176. However, alumina has the following defects: (1) it has a relatively large permittivity which causes a delay in signal propagation; (2) it has a high coefficient of thermal expansion which differs greatly from that of silicon semiconductor chips; (3) it has a high firing temperature which makes it difficult to achieve simultaneous firing with good electrical conductors such as gold, silver and copper. Alumina substitutes that meet the recent demand for the high-speed production of electrically insulating ceramic materials with high density and have low permittivity, low coefficient of thermal expansion comparable with that of silicon semiconductor chips, and firing temperature are necessary. Glass, for example, glass as described in Japanese Patent Publication No. 6257/82 and glass-ceramic product as described in Japanese Patent Application (OPI) No. 111517/79 (the term "OPI" as used herein refers to a "published unexamined Japanese patent application") as one of these substitutes has been studied by many researchers. However, glass is weak with respect to mechanical shock, cannot be easily formed to exact dimensions and suffers a great power factor tan δ. These inherent defects make glass unsuitable for use as electrical insulators.

SUMMARY OF THE INVENTION

As a result of various efforts to produce a glass-ceramic product suitable for use in electrical insulators, we have found that a glass-ceramic product having a selected composition can provide a material having a relatively small permittivity and low coefficient of thermal expansion, as well as a low firing temperature and high mechanical strength.

A glass-ceramic product of the present invention is produced by the process comprising the following steps of:

combining 0.1 to 6 wt% of a compound selected from the group consisting of $B_2O_3$ and $P_2O_5$ with a mixture consisting essentially of 54 to 63 wt% $SiO_2$, 20 to 28 wt% $Al_2O_3$, 10 to 18 wt% MgO and 2 to 6 wt% ZnO;

forming a glassy material from the combined compound and mixture;

grinding the glassy material to form a frit;

molding the frit;

firing the molded frit into a crystalline form.

The criticality of the proportions of the respective components of the glass-ceramic product of the present invention is described below.

DETAILED DESCRIPTION OF THE INVENTION

Silicon dioxide ($SiO_2$) is used in an amount ranging from 54 to 63 wt% and preferably in an amount ranging from 54 to 60 wt%. If less than 54 wt% of $SiO_2$ is used, more of the glass phase remains uncrystallized. On the other hand, if more than 63 wt% of $SiO_2$ is used, excessive crystallization occurs and a dense glass-ceramic product cannot be produced even if an increased amount of $B_2O_3$ and/or $P_2O_5$ is added.

Aluminum oxide ($Al_2O_3$) is used in an amount ranging from 20 to 28 wt% and preferably in an amount ranging from 24 to 27 wt%. If less than 20 wt% of $Al_2O_3$ is used, more of the glass phase remains uncrystallized and the resulting product has low mechanical strength and suffers a great power factor tan δ. If more than 28 wt% of $Al_2O_3$ is used, the mixture of ingredients does not melt easily and a dense glass-ceramic product is not obtainable after firing and crystallization.

Magnesium oxide (MgO) is used in an amount ranging from 10 to 18 wt% and preferably in an amount ranging from 11 to 15 wt%. If less than 10 wt% of MgO is used, the mixture of ingredients does not melt easily, and if more than 18 wt% of MgO is used, more of the glass phase remains unrecrystallized.

Zinc oxide (ZnO) is used in an amount ranging from 2 to 6 wt% and preferably in an amount ranging from 2 to 4 wt%. If less than 2 wt% of ZnO is used, the mixture of ingredients does not melt easily. If more than 6 wt% of ZnO is used, excessive crystallization occurs and a dense glass-ceramic product cannot be obtained even if an increased amount of $B_2O_3$ and/or $P_2O_5$ is added. The particularly preferred amount of ZnO for providing a dense product is less than one third of the amount of MgO.

The other essential ingredient of the glass-ceramic product of the present invention is 0.1 to 6 wt% and preferably 2 to 4 wt% of $B_2O_3$ or $P_2O_5$ or both. Either ingredient is effective for providing a dense glass-ceramics product. However, $B_2O_3$ is more effective than $P_2O_5$. If less than 0.1 wt% of $B_2O_3$ and/or $P_2O_5$ is used, their intended effect is not achieved. On the other hand, if more than 6 wt% of $B_2O_3$ is used, the resulting product has an increased amound of glass phase remaining uncrystallized which is underirable with respect to mechanical strength and power factor tan δ.

If necessary, a trace amount (for example, up to 3 wt%) of a common nucleating agent such as $ZrO_2$ or $TiO_2$ may be used. This may cause a slightly excessive crystallization, but has no deleterious effect on the object of the present invention.

The glass-ceramic product of the present invention may be produced from these ingredients by the following procedure: measured amounts of the necessary ingredients are put in a mixer where they are blended into an intimate mixture; the mixture is put in a container such as a platinum or alumina crucible where it is melted at a suitable temperature between 1,400° and 1,500° C.; the melt is then quenched in water to form a glassy material; fritting the glassy material by grinding it in a ball mill into particles having an average size of 2 to 7 μm and preferably 2 to 4 μm; molding the frit into a predetermined shape by the conventional green sheet method or mold press method; firing the molded frit to a temperature between 900° and 1,000° C. and preferably between 920° to 950° C. at a rate of 50° to 200° C./hr and preferably of 50° to 100° C./hr; maintaining the temperature for 1 to 4 hours and preferably 2 to 3 hours; and cooling the fired product at a rate of 50° to 300° C./hr and preferably of 100° to 200° C./hr. By these procedures, the desired glass-ceramic product consisting of cordierite as a major component, β-quartz solid solution and the residual (uncrystallized) glass phase can be produced.

As described above, the glass-ceramic product of the present invention is manufactured by firing and crystallizing the mixture of the specified amounts of $SiO_2$, $Al_2O_3$, MgO, ZnO, and $B_2O_3$ and/or $P_2O_5$. Therefore, the product has the following advantages.

Dielectric properties: Low permittivity ($\epsilon$) = 5 to 5.5 compared with alumina ($\epsilon$ = 9) and low power factor (tan $\delta$) $\leq 10 \times 10^{-4}$ ($10^7$ to $10^8$ Hz).

Coefficient of thermal expansion: Ca. $20 \times 10^{-7}$ to $30 \times 10^{-7}$ which is comparable with the value for silicon semiconductor chips. A substantially constant value is obtained irrespective of the change in crystallizing temperature.

Firing and crystallizing temperature: Ca. 920° to 1,000° C.

Moisture absorption: 0% (due to the dense product)

Mechanical strength: As high as 2,000 to 3,000 kg/cm$^2$

Other features: No alkali metal is present. crystallization is possible without using a nucleating agent such as $ZrO_2$ which may cause adverse effects on $\alpha$-rays.

Because of these many advantages, the glass-ceramic product of the present invention is best suited for use as laminated ceramic substrates such as multi-chip mounting subsrtrates and print circuit boards, as well as electrical insulators like shielding agents and IC packges. The glass-ceramic product of the present invention is also usable as a material for heat exchangers.

While the reason why the product of the present invention has these advantages has not been fully unravelled, a plausible explanation would be s follows. It is generally very difficult to obtain dense glass-ceramic products from glass powders such as cordierite by means of firing and crystallization. On the other hand, the product of the present invention can be obtained in a highly dense form by firing and crystallizing a glass powder of the specified ingredient at a temperature not higher than 1,000° C. Even glass products such as sample Nos. 7 and 8 in Table 1 (see below) that are similar in formulation to the ingredient of the present invention could not be obtained in a dense form since their principal crystal phases were cordierite as a major crystal component and $\beta$-spodumene (spodumene having Li replaced by Zn).

The principal crystal phases of the product of the present invention are cordierite as a major crystal component and $\beta$-quartz solid solution (partially $\beta$-spodumene), and it is presumed that $\beta$-quartz solid solution plays an important role in achieving a dense structure. Furthermore, in the product of the present invention, sufficient crystallization occurred to minimize the amount of the residual glass phase. This seems to explain the low power factor (tan $\beta \leq 10 \times 10^{-4}$ at $10^7$ to $10^8$ Hz) and the great mechanical strength of the product.

The present invention is hereunder described in greater detail by working examples. The scope of the invention is by no means limited to these examples and various modifications are possible without departing from the spirit of the invention.

EXAMPLES

In order to pvodide glass products having formulation indicated in Table 1, ZnO, $MgCO_3$, $Al(OH)_3$, $SiO_2$, $H_3BO_3$, $H_3PO_4$ and $ZrO_2$ were measured and blended intimately in a mixer. Each mixture was melted in a platinum or alumina crucible at a suitable temperature between 1,400° and 1,500° C. The melt was quenched in water to form a glassy material. This material was ground in an alumina ball mill to produce a frit (glass powder).

The frit was molded into a suitable shape by the conventional green sheet method or mold press method. The molding was heated to a temperature between 900° and 1,000° C. (for the specific temperatures, see Table 1) at a rate of 100° C./hr, and fired the same temperature for 2 hours. Subsequently, the fired product was cooled at a rate of 200° C./hr. The dielectric constant, power factor (tan $\delta$), coefficient of thermal expansion, moisture absorption and mechanical strength of each of the samples of glass-ceramic product were measured, and the results are shown in Table 1.

TABLE 1

| | Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| Components (%) | | | | | | | | | | | |
| ZnO | 2.5 | 3 | 3 | 3.5 | 4 | 4 | 4 | 3 | 3 | | — |
| MgO | 12 | 14.5 | 14.5 | 15 | 13 | 7 | 9 | 11 | 12 | Alumina | — |
| $Al_2O_3$ | 25.5 | 24.5 | 24 | 23.5 | 23 | 19 | 27 | 32 | 22 | Substrate | 15.0 |
| $SiO_2$ | 57.5 | 56 | 55 | 56 | 58 | 67.5 | 57 | 51 | 55 | | 71.5 |
| $B_2O_3$ | 2.0 | 1.5 | 2 | 1 | 1 | 3.0 | 1 | 2 | 7.0 | | — |
| $P_2O_5$ | 0.5 | — | 1 | 1 | 1 | 0.5 | 1 | 1 | — | | 1.5 |
| $ZrO_2$ | — | 0.5 | 1 | — | — | — | 1 | — | 1.0 | | — |
| $Li_2O$ | — | — | — | — | — | — | — | — | — | | 10.0 |
| $K_2O$ | — | — | — | — | — | — | — | — | — | | 2.0 |
| Moisture Absorption (%) | 0 | 0 | 0 | 0 | 0 | 5% | 2% | 5% | 0 | 0 | 0 |
| Dielectric Constant (at $10^7$ Hz) | 5.2 | 5.5 | 5.3 | 5.5 | 5.5 | 4.7* | — | — | 5.5 | 9 | 6.5 |
| Tan $\delta$ ($\times 10^{-4}$, at $10^7$ to $10^8$ Hz) | $\leq 10$ | $\leq 10$ | $\leq 10$ | $\leq 10$ | $\leq 10$ | 40 | — | — | 35 | 3~5 | — |
| Coefficient of Thermal Expansion (RT. to 400° C., $\times 10^{-7}$) | 25 | 27 | 26 | 30 | 27 | 15 | — | — | 35 | ca. 70 | 32 |
| Firing Temp. (°C.) | 950 | 950 | 950 | 950 | 950 | 1000 | 1000 | 1000 | 900 | 1600 | 925 |
| Breaking Strength (kg/cm$^2$) | 2200 | 2600 | 2300 | 2300 | 2400 | 500 | 700 | 500 | 1400 | ca. 4000 | 2110 |
| Principal Crystam Phases | Cordierite, $\beta$-Quartz Solid Solution | | | | | Coordierite, $\beta$-Spodumene (Zn-Substituted Type) | | | Cordierite, $\beta$-Quartz Solid Solution | $\alpha$-$Al_2O_3$ | $\beta$-Spodumene, Lithium Metasilicate |
| Remarks | Samples of The Present | | | | | Samples outside the Scope of | | | | Comparative | |

TABLE 1-continued

| | Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| | Invention | | | | The Present Invention | | | | | Samples | |

Note: *This value is lower than the others probably because of the presence of many pores.

From the results shown in Table 1, it can be seen that the products of the present invention can be obtained in a highly dense form by firing and crystallizing a glass powder of the specified composition at a temperature not higher than 1,000° C., and can be sufficiently put in practical use because they have permittivity of 5.0 to 5.5 lower than the conventional alumina substratum, coefficient of thermal expansion of $20 \times 10^{-7}$ to $30 \times 10^{-7}$ comparable with that of silicon semiconductor chips and great mechanical strength of 2,000 to 3,000 kg/cm$^2$.

While the invention has been described in detail and with reference to specific embodiment thereof, it will be apparent to one skilled in the art that various changes and modifications can be made therein without departing from the spirit and scope thereof.

What is claimed is:

1. A glass-ceramic product which is an electrically insulating ceramic material, shows relatively small permittivity and has a low coefficient of thermal expansion, said product being produced by the process comprising the steps of:
   combining 0.1 to 6 wt% of a compound selected from the group consisting of $B_2O_3$ and $P_2O_5$ with a mixture consisting essentially of 54 to 63 wt% $SiO_2$, 20 to 28 wt% $Al_2O_3$, 10 to 18 wt% MgO and 2 to 6 wt% ZnO;
   forming a glassy material from the combined compound and mixture;
   grinding the glassy material to form a frit;
   molding the frit;
   firing the molded frit into a crystalline form.

2. A glass-ceramic product produced by the process as claimed in claim 1, wherein the mixture consists of 54 to 63 wt% $SiO_2$, 20 to 28 wt% $Al_2O_3$, 10 to 18 wt% MgO and 2 to 6 wt% ZnO.

3. A glass-ceramic product produced by the process as claimed in claim 1, wherein the combined compound and mixture includes a trace amount of a nucleating agent.

4. A glass-ceramic product produced by a process as claimed in claim 3, wherein the nucleating agent is selected from the group consisting of $ZrO_2$ and $TiO_2$.

5. A glass-ceramic product produced by the process as claimed in claim 1, wherein the grinding is carried out in a bowl mill in order to obtain particles having an average size in the range of 2 to 7 μm.

6. A glass-ceramic product produced by the process as claimed in claim 1, wherein the molding is carried out by a green sheet method.

7. A glass-ceramic product produced by the process as claimed in claim 1, wherein the molding is carried out by a mold press method.

8. A glass-ceramic product produced by the process as claimed in claim 1, further comprising firing the molded frit to a temperature between 900° and 1,000° C. at a rate of 50° to 200° C./hr; maintaining the temperature 1 to 4 hours and cooling at a rate in the range of 50° to 300° C./hr.

* * * * *